United States Patent [19]
Ko

[11] Patent Number: 5,301,030
[45] Date of Patent: Apr. 5, 1994

[54] OPTICAL ILLUMINATION APPARATUS FOR A DISPLAY UNIT WITH EFFICIENT LIGHT SOURCE POLARIZATION

[75] Inventor: Han I. Ko, Suwon, Rep. of Korea

[73] Assignee: SamSung Electronics Co., Ltd., Suwon, Rep. of Korea

[21] Appl. No.: 926,315

[22] Filed: Aug. 10, 1992

[30] Foreign Application Priority Data

Aug. 13, 1991 [KR] Rep. of Korea ............... 91-13947
Dec. 27, 1991 [KR] Rep. of Korea ............... 91-24713

[51] Int. Cl.$^5$ .................... H04N 5/74; H04N 9/31
[52] U.S. Cl. ......................... 348/762; 348/761; 348/765; 348/782
[58] Field of Search ............ 359/48, 49, 43, 490, 359/634; 358/231, 236; H04N 5/74, 9/31

[56] References Cited
U.S. PATENT DOCUMENTS 4,913,529 4/1990 Goldenberg et al. ............ 359/49
5,042,921 8/1991 Sato et al. ..................... 359/49 X

*Primary Examiner*—Mark R. Powell
*Attorney, Agent, or Firm*—Robert E. Bushnell

[57] ABSTRACT

An optical irradiating apparatus for use in a display unit and an optical irradiating method thereof is disclosed. The apparatus includes an optical source lamp, a polarizer secured within a polarized light transducer and for separating light rays incoming from the optical source lamp, and an optical/video converting device for converting the reflected light rays (reflected by the polarizer) to video signals. The light rays which have undergone the above procedure pass through an optical irradiating lens, and then, are sent to a screen. The optical irradiating apparatus further includes first and second reflecting mirrors installed respectively above and below the polarizer within the optical polarizing device and for reflecting the light rays passed through the polarizer, and a λ/4 plate installed on the surface of the second reflecting mirror and for polarizing the light rays (reflected from the first reflecting mirror) to the same component as that of the initial reflected light rays. In response to present invention, the light rays passed through the polarizer can be utilized, and therefore, the optical efficiency can be improved by about 80–90% over that of the conventional technique.

5 Claims, 3 Drawing Sheets

OPTICAL ILLUMINATION APPARATUS FOR A DISPLAY UNIT WITH EFFICIENT LIGHT SOURCE POLARIZATION

FIELD OF THE INVENTION

The present invention relates to a display unit, and particularly to an optical irradiating apparatus for a display unit and an irradiating method thereof, in which the optical efficiency is improved when light rays incoming from an optical source are polarized and are directed toward a screen.

BACKGROUND OF THE INVENTION

Generally, a display unit using a polarized light transducer polarizes light rays after receipt of them from an optical source, and converts the light rays into video signals before sending them to a screen. This device is classified as a reflecting type optical irradiating device, and a transmission type optical irradiating device.

First, the reflecting type optical irradiating device which is constructed, as shown in FIG. 1 operates in such a manner that light rays 11 incoming at a certain angle from an optical source 10 pass through a focussing lens 12 before passing through a transmission window 13a which is installed below a polarized light transducer 13.

Thereafter, the incident rays 11 are broken down into transmission light rays 11a passing through a polarizer 14 of the polarized light transducer 13, and reflected light rays 11b reflected from the polarizer 14. The reflected light rays 11b which are separated by the polarizer 14 pass through the transmission window 13b of the polarized light transducer 13, and are input into an optical/video converting device 15. Meanwhile, in accordance with the video signals which are supplied from a video signal generator 16, the optical/video converting device 15 changes the polarizing direction of the reflected light rays based on the brightness of the images. Then, the reflected light rays sequentially pass through a transmission window 13b, a polarizer 14 and a transmission window 13c of the polarized light transducer 13, and then, pass through an irradiating lens 18, before being sent to a screen 19.

Here, the light rays which are reflected from the optical/video converting device 15 are the ones which are subjected to a change of polarizing directions after the modification of the reflected light rays. Therefore, if they enter into the polarizer 14 again, the transmission component passes through it in accordance with the polarized direction, and the reflected component is reflected, thereby making it possible to distinguish the brightnesses. Meanwhile, the transmission type optical irradiating device which is constituted as shown in FIG. 2 operates in such a manner that incident light rays 11 which enter at a certain angle pass through a focussing lens 12, and then, pass through a transmission window 13a which is installed above a polarized light transducer 13. Thereafter, the incident light rays 11 are broken down into transmission light rays 11a passing through a polarizer 14 of the polarized light transducer 13, and reflected light rays 11b reflected from the polarizer 14. The reflected light rays 11b which are separated by the polarizer 14 pass through a transmission window 13b of the optical polarizing device 13, and then, are sent to a first color separating filter 20. Then of the three colors of R (red), G (green) and B (blue), the R color is reflected, and the remaining G and B colors are permitted to pass through a second color separating filter 21. Meanwhile, the R color which is reflected from the first color separating filter 20 is reflected again from a first reflecting mirror 22 which is disposed above the first color separating filter 20. Then, the R color reflected of the first color separating filter 20 passes through a liquid crystal panel 24 which is disposed at the front of the first reflecting mirror 22, and then sends to a first color synthesizing filter 23 which is disposed down stream thereof.

Of the G and B colors which have passed through the first color separating filter 20, the G color is reflected from the second color separating filter 21. Then the G color passes through a liquid crystal panel 25 which is disposed above the second color separating filter 20, and then, the G color is reflected from the first color synthesizing filter 23, before being synthesized with the R color. The B color which has passed through the second color separating filter 21 passes through a liquid crystal panel 26 which is disposed at the front of the second color separating filter 21. Then the B color is reflected from a second reflecting mirror 27 which is disposed at the front of the liquid crystal panel 27, and then, the B color is synthesized by a second color synthesizing filter 28. Then the R, G and B colors pass through a transmission lens 18, before forming an image on the screen 19. Under this condition, the liquid crystal panels 24, 25 and 26 are respectively provided with different transmissivities for the R, G and B colors, so that the colors on the screen should be decided in accordance with the supply of electrical signals. That is, if the R, G and B colors are applied to the liquid crystal panels 24, 25 and 26, a color image is regenerated on the screen.

However, in the above described optical irradiating apparatus for a display unit, much loss occurs in the light rays after they have passed through the polarizer after the emission of them from the optical source.

Because only the reflected light rays are used, the actual usable amount is about 50% of the total incident rays, thereby severely reducing the optical efficiency.

SUMMARY OF THE INVENTION

The present invention is intended to overcome the above described disadvantages of the conventional techniques.

Therefore, it is the object of the present invention to provide an optical irradiating apparatus for a display unit and an optical irradiating method thereof, in which the optical efficiency can be improved by about 80-90% by re-using the transmission components of the light rays after the light rays pass through a polarizer of an optical polarizing device.

In achieving the above object, the optical irradiating apparatus according to the present invention having an optical source lamp; a polarizer installed within an optical polarizing device (i.e., a polarized light transducer), for receiving incident light rays emitted from the optical source lamp; and polarizing the incident light rays and an optical/video converting device for converting the polarized light rays reflected from the polarizer into video signals, whereby the light rays are sent through a transmission lens to a screen.

The optical irradiating apparatus of the present invention further includes: first and second reflecting mirrors installed at proper positions above and below the polarizer of the polarized light transducer for reflecting the polarized light rays reflected from the polarizer through the polarizer; and a λ/4 plate installed on the surface of the second reflecting mirror, for polarizing the reflected light rays from the first reflecting mirror into the same component as that of the initial reflected light rays.

In achieving the above object, the optical irradiating method of the present invention including the steps of: polarizing incident light rays upon reception from an optical source; converting the polarized light rays reflected from a polarizer into video signals, prior to transmission of the video signals to a screen.

The optical irradiating method of the present invention further comprises the steps of: directly sending the light rays reflected by the polarizer to the screen; reflecting the light rays passed through the polarizer by means of first and second reflecting mirrors, polarizing them by means of a λ/4 plate, before sending them to the screen.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
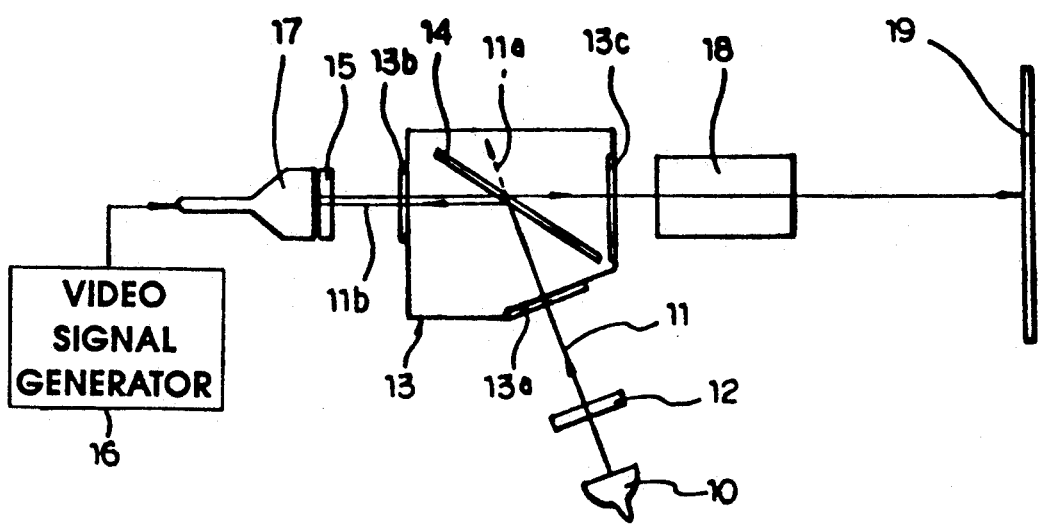
FIG. 1 is a schematic view of the conventional reflecting type optical irradiating apparatus for a display unit.
Figure 2:
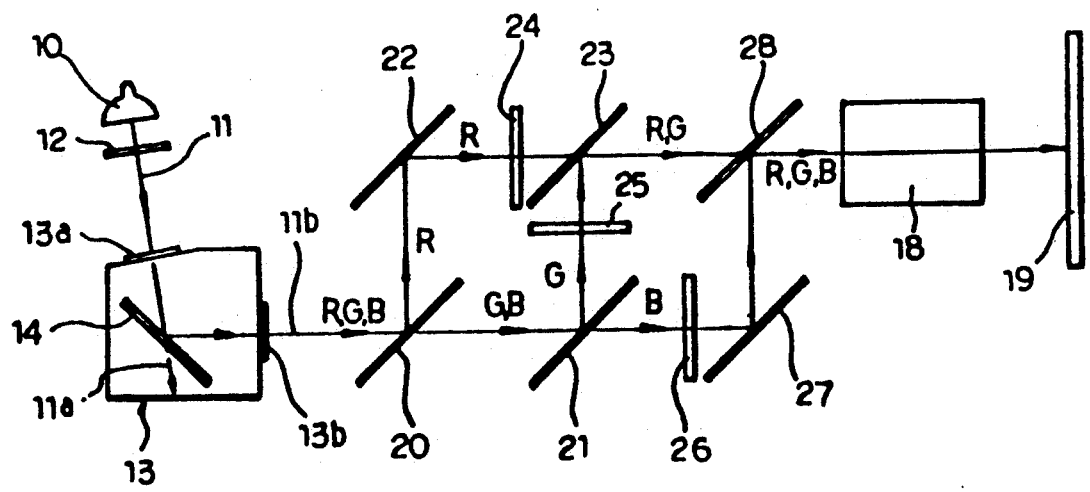
FIG. 2 is a schematic view of the conventional transmission type optical irradiating apparatus for a display unit.
Figure 3A:
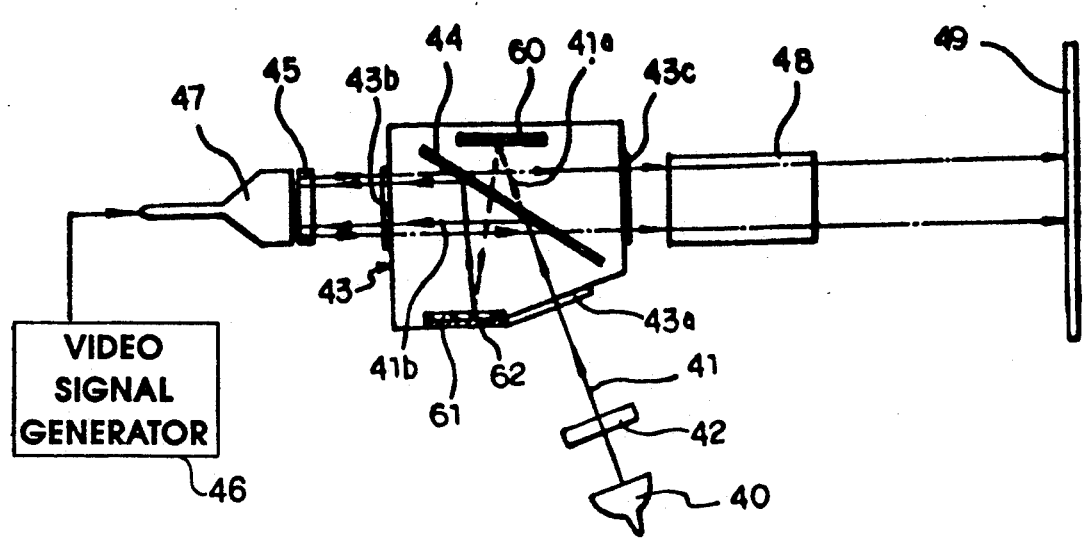
FIG. 3A is a schematic view of the reflecting type optical irradiating apparatus for a display unit according to the present invention.
Figure 3B:
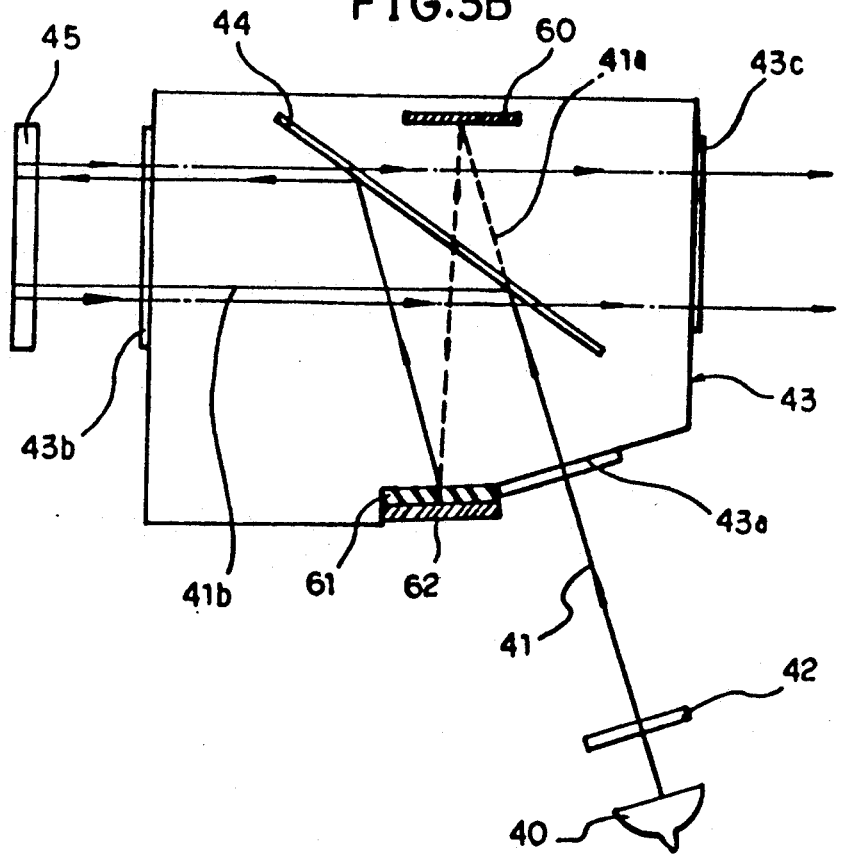
FIG. 3B is an enlarged view of the critical portion of the apparatus of FIG. 3A.

FIGS. 3A and 3B illustrate the reflecting type optical irradiating apparatus according to the present invention, and as shown in this drawing, light rays 41 which enter at a certain angle from an optical source lamp 40 pass through a focussing lens 42, and pass through a transmission window 43a which is installed below a optical polarizing device (i.e., polarized light transducer) 43.

Thereafter, the incident light rays 41 are broken down into transmission light rays 41a passing through a polarizer 44, and reflected light rays 41b reflected from the polarizer 44. The reflected light rays 41b which are separated by the polarizer 44 enter into an optical/video converting device 45, after passing through a transmission window 43b which is installed at a side of the polarized light transducer 43.

Meanwhile, the transmission light rays 41a which have passed through the polarizer 44 pass through the polarizer again, after being reflected by a first reflecting mirror 60 which is installed above the polarizer 44. Then, the light rays are modified into circularly polarized light rays after passing through a λ/4 plate 61 which in itself is an optical polarizer being installed below the polarizer 44, and are then reflected by a second reflecting mirror 62 which is installed below the plate 61 λ/4.

Under this condition, the transmission light rays 41a which are reflected by the second reflecting mirror 62 pass through the λ/4 plate 61 again so as to be polarized into the same component as that of the initial reflected light rays 41b. Then they are reflected by the polarizer 44, and then, enter into the optical/video converting device 45. The video signals which are supplied from a video signal generator 46 form a desired images on the fluorescent film of a picture tube 47, while the optical/video converting device 45 changes the polarizing direction of the incoming reflected light rays 41b in accordance with the brightness of the image.

Then, the light rays pass through a transmission window 43b, the polarizer 44 and a transmission window 43c of the optical polarizing device 43 in the cited order, and are sent through an irradiating lens 48 to a screen 49. Here, the light rays which are reflected from the optical/video converting device 45 are the ones which were subjected to changes of the polarizing directions after the modification of the initial reflected light rays 41b.

Therefore, when they enter into the polarizer again, the transmission component of the light rays is permitted to pass through, while the component of the reflected light rays is reflected, thereby making it possible to distinguish the brightness of an image.

Figure 4A:
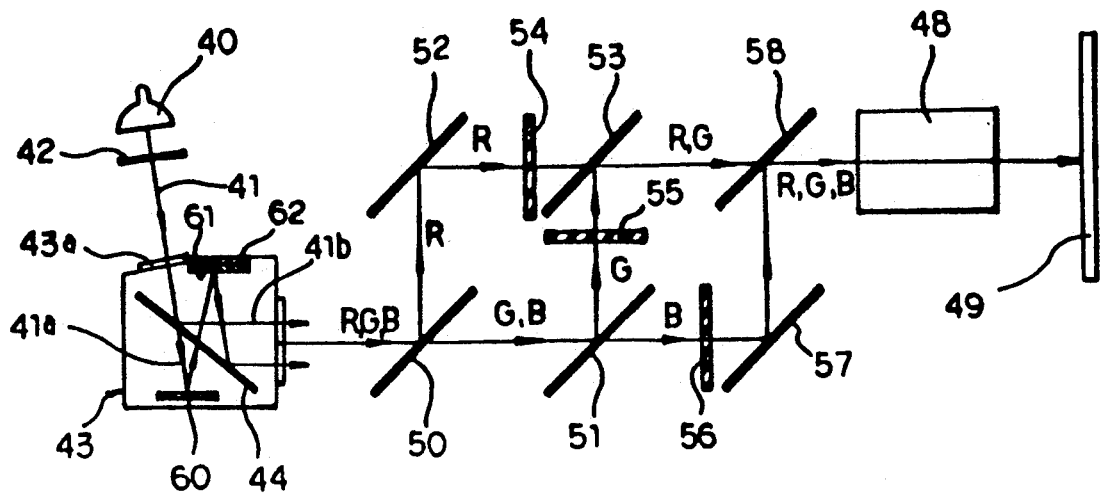
FIG. 4A is a schematic view of the transmission type optical irradiating apparatus for a display unit according to the present invention.
Figure 4B:
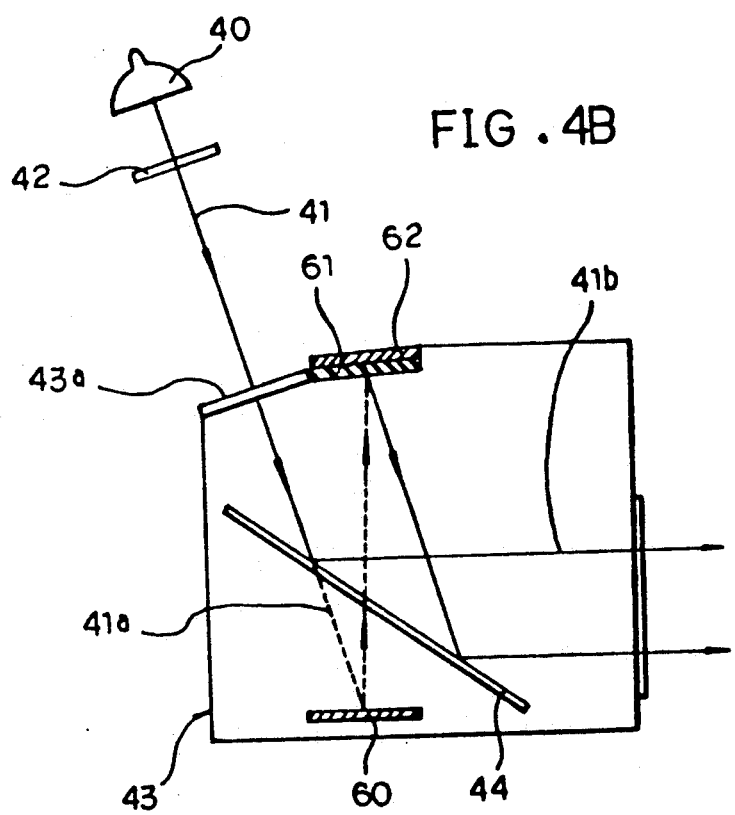
FIG. 4B is an enlarged view of the critical portion of the apparatus of FIG. 4A.

Meanwhile, as shown in FIGS. 4A and 4B, the transmission type optical irradiating apparatus operates in such a manner that light rays 41 which enter with a certain angle from an optical source lamp 40 pass through a focussing lens 42, and pass through a transmission window 43a which is installed above an optical polarizing device 43.

Thereafter, the incident light rays 41 are broken down into transmission light rays 41a passing through the polarizer 44, and reflected light rays 41b reflected from the polarizer 44. The reflected light rays 41b which are separated by the polarizer 44 enter into a first color separating filter 50, after passing through a transmission window 43b which is installed at a side of the optical polarizing device 43.

Meanwhile, the transmission light rays 41a which have passed through the polarizer 44 are reflected from a first reflecting mirror 60 which is installed below the polarizer 44, before passing through the polarizer 44 again. Then the light rays become circularly polarized light rays after passing through a λ/4 plate 61 which in itself is an optical polarizer being installed above the polarizer 44. Then the light rays are reflected by a second reflecting mirror 62 which is installed above the λ/4 plate 61. Further, the light rays 41a which are reflected by the second reflecting mirror 62 pass through the λ/4 plate again. During this time, the light rays 41a are polarized into the same component as that of the initial reflected light rays 41b, and then, enter into the first color separating filter 50, after being reflected by the polarizer 44.

Thus, of the three colors of R (red), G (green) and B (blue), the R color is reflected from the first color separating filter 50, while the G and B colors are permitted to pass through the first color separating filter 50 in order to be sent to the second color separating filter 51. Further, the R color which is reflected by the first color separating filter 50 is reflected again by a first reflecting mirror 52 which is positioned above the first color separating filter 50. Then the R color pass through a liquid crystal panel 54 positioned at the front of the mirror 52, and then, are sent to a first color synthesizing filter 53. Meanwhile, of the G and B colors which have passed through the first color separating filter 50, the G color is reflected by the second color separating filter 51, and then, pass through a liquid crystal panel 55. Then the G color is reflected by the first color synthesizing filter 53, and, is synthesized with the R color. The B color which has passed through the second color separating filter 51 passes through a liquid crystal panel 56 which is installed at the front of the filter 51. Then, the B color is reflected by the second reflecting mirror 62 which is disposed at the front of the panel 56, and then, the B color is synthesized by a second color synthesizing filter 58 which is disposed above the mirror 62. And, the three colors of R, G and B which are thus synthesized pass through an irradiating lens 48, before forming an image on the screen 49. Here, the liquid crystal panels 54, 55 and 56 are respectively provided with different transmissivities for the R, G and B colors, so that colors on the screen should be decided upon supplying electrical signals.

Upon supplying the R, G and B colors to the liquid crystal panels 54, 55 and 56, a color image is formed on the screen 49 in the same way as the known technique. Meanwhile, in the reflecting type and transmission type optical irradiating apparatuses of the present invention, a fluid which has the same refractive index as that of the polarizer 44 can be injected into the optical polarizing device 43, so that no refraction should occur during the time when the light rays pass through the polarizer 44.

Figure 5:
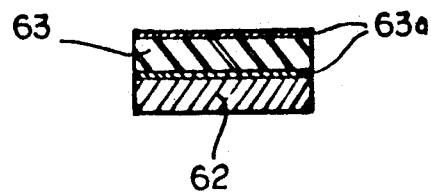
FIG. 5 illustrates another embodiment of the optical polarizing device according to the present invention.

Further, the same effect can be obtained by arranging as follows. That is, instead of the λ/4 plate 61 which is an optical polarizer installed within the optical polarizing device 43, glass plates 63a are installed above and below as shown in FIG. 5, and a liquid crystal 63 which is twisted by 45° is injected into between the glass plates 63a, thereby forming a liquid crystal panel to obtain the same effect. According to the optical irradiating apparatus and the optical irradiating method of the present invention as described above, the light rays which have passed through a polarizer is polarized again in order to obtain an optical efficiency of at least 80-90% higher than the conventional technique.

The present invention is in no way limited to the embodiment described hereinabove. Various modifications of disclosed embodiment as well as other embodiments of the present invention will become apparent to persons skilled in the art upon reference to the description of the invention. It is therefore contemplated that the appended claims will cover any such modifications or embodiments as fall within the true scope of the invention.

What is claimed is:

1. An optical irradiating apparatus for use in a display unit, comprising:
    an optical source for generating light rays;
    a polarized light transducer;
    a polarizer installed within the polarized light transducer, for polarizing the light rays incoming from said optical source;
    an optical/video converting device for converting the light rays reflected from said polarizer into optical signals representative of an image;
    an irradiating lens for irradiating the optical signals from said optical/video converting device onto a screen of said display unit;
    first and second reflecting mirrors respectively disposed above and below said polarizer, for reflecting the light rays passed through and reflected from said polarizer; and
    a λ/4 plate installed on the surface of said second reflecting mirror, for polarizing the light rays reflected from said polarizer via said first reflecting mirror.

2. The optical irradiating apparatus as claimed in claim 1, wherein a fluid having a same reflective index as that of said polarizer is injected into said polarized light transducer, thereby preventing refraction of the light rays.

3. An optical irradiating method for use in a display unit, comprising the steps of:
    polarizing light rays incoming from an optical source by means of a polarizer;
    converting the light rays reflected from said polarizer to optical signals representative of an image before sending the light rays to a screen of said display unit;
    directly sending the light rays reflected from said polarizer to said screen;
    reflecting the light rays passed through said polarizer by means of first and second reflecting mirrors, and polarizing the light rays reflected from the first and second reflecting mirrors by means of a λ/4 plate, before sending the light rays to said screen.

4. An illumination system for projecting an image of high luminance displayed on a cathode ray tube through a projecting lens, using a light beam supplied from a light source, said illumination system comprising:
    a polarizing beam splitter for splitting the light beam emitted from said light source into a first polarized light and a second polarized light;
    a plurality of reflectors for reflecting the light beam supplied from said polarizing beam splitter, said plurality of reflectors having at least one reflector being a one-quarter wave reflector; and
    converting means for converting the light beam supplied from said polarizing beam splitter into optical signals representative of an image in response to a brightness of the image displayed on said cathode ray tube.

5. An illumination system for projecting an image as said image having high luminance through a projecting lens using a light beam supplied from a light source, said illumination system comprising:
    a polarizing beam splitter for splitting the light beam emitted from said light source into a first polarized light and a second polarized light;
    a plurality of reflectors for reflecting the light beam supplied from said polarizing beam splitter, said plurality of reflectors having at least one reflector being a one-quarter wave reflector;
    a plurality of color component beam splitters for splitting the light beam supplied from said polarizing beam splitter into a plurality of color component beams;
    a color component beam combining plate for combining at least two color component beams; and
    a liquid crystal display panel for receiving a linearly polarized light beam and displaying the image.

* * * * *

UNITED STATES PATENT AND TRADEMARK OFFICE
CERTIFICATE OF CORRECTION

PATENT NO. : 5,301,030
DATED : April 5, 1994
INVENTOR(S) : Han-II Ko

It is certified that error appears in the above-indentified patent and that said Letters Patent is hereby corrected as shown below:

Column 3, line 2, delete "through"

Signed and Sealed this

Fifteenth Day of August, 1995

Attest:

BRUCE LEHMAN

Attesting Officer    Commissioner of Patents and Trademarks